June 1, 1937. W. H. HOWE 2,082,496
VOLTAGE REGULATION AND CIRCUITS THEREFOR
Filed April 29, 1933 5 Sheets-Sheet 1

Inventor
Wilfred H. Howe
by Wright Brown Quinby May
Attys.

June 1, 1937.  W. H. HOWE  2,082,496
VOLTAGE REGULATION AND CIRCUITS THEREFOR
Filed April 29, 1933  5 Sheets-Sheet 3

Inventor
Wilfred H. Howe
by Wright, Brown, Quinby & May
Attys.

June 1, 1937.　　　　W. H. HOWE　　　　2,082,496
VOLTAGE REGULATION AND CIRCUITS THEREFOR
Filed April 29, 1933　　　5 Sheets-Sheet 5

Fig. 9.

Inventor
Wilfred H. Howe
by Wright, Brown, Quinby & May
Attys.

Patented June 1, 1937

2,082,496

UNITED STATES PATENT OFFICE 2,082,496

VOLTAGE REGULATION AND CIRCUITS THEREFOR

Wilfred H. Howe, Winchester, Mass., assignor to The Cincinnati Milling Machine Co., Cincinnati, Ohio, a corporation of Ohio Application April 29, 1933, Serial No. 668,582

24 Claims. (Cl. 172—179)

This invention relates to the control of voltage and more particularly to controlled automatic output voltage regulation from an alternating current power supply, the voltage regulated output being either alternating or direct current. According to this invention this regulation is accomplished through the control of mechanism interposed between the input and output circuits and which controls the transmission of energy from one to the other, this mechanism being responsive to conditions in the output circuit. Mechanism particularly suitable for the purpose comprises one or more rectifiers of the gas filled type whereby passage of energy may be controlled by variation of grid voltage, such a rectifier of the hot cathode type being the most suitable for the purpose. This grid voltage variation controls the time of ignition of the arc in the rectifier with respect to the duration of the positive half cycle of the plate-cathode voltage. The energy source may be any commercial alternating current power supply and the output circuit whether direct or alternating may be maintained at any desired potential between 0 and a maximum, or varied as desired. This potential may be independent of both input voltage and output load or may be caused to increase or decrease in any desired ratio to either. The output voltage is controlled by the voltage of a controlling direct current circuit which consumes a very small amount of power, one watt being more than adequate. This power may be supplied from a great variety of sources; for example, it may be drawn from a separate auxiliary source of direct current potential, from an auxiliary direct current power supply which may, if desired, be used primarily for other purposes, as, for example, the energization of the field of a direct current motor, or from automatic control circuits such as those actuated by variations of a capacity, inductance, or resistance, which may in turn be controlled by other variables.

In connection with the control through voltage of the output an automatic or compounding modifying control dependent on load on the output circuit and arranged to under or over or just compensate for load changes, as may be desired, may be used. Such automatic voltage and compounding control is particularly useful as a correcting factor in conjunction with a main selective control, as for example, in the case of a motor where the main control determines the speed of the motor while the automatic control corrects in whole or in part or even over corrects, if desired, for other variables, such as those arising from changing load conditions. Thus, the main control may, if desired, be set with full correction, with assurance that the motor speed will remain at the speed corresponding to the setting of the main control regardless of changing load conditions. This invention, however, is not limited to any particular type of load for the output circuit.

One of the important features of this invention resides in the fact that the control may be produced through automatic voltage variations. The control mechanism in most cases may be direct current although convenient alternating current voltage may often be utilized. The control does not depend on any variations of phase relation. Such phase relation variations might involve substantial complications either electrical or mechanical or both.

In accordance with one aspect of this invention, the apparatus is essentially a power amplifier wherein the variations of voltage in the low power control circuit, which may if desired be caused to vary automatically, is caused to produce corresponding variations in voltage of an output circuit of any desired power capacity, an important attribute of this apparatus being that the voltage of the output circuit may be maintained constant independent of the load on the output circuit or may be made to vary inversely or directly with variations of the output load. One of the important applications of this apparatus is for the operation of direct current shunt motors by means of the setting of a small controlling potentiometer. The speed of a direct current shunt motor may be caused to vary continuously over a large range of speed, say of 20 to 1, maintaining its speed constant at any point within this range under all conditions of load from no load to full load torque or, if desired, the motor speed may actually increase with increase of motor load.

The means which controls the passage of power from the input circuit to the output circuit under the control of the low power controlling circuit is shown as of the grid controlled rectifier type and preferably because of its convenience of operation is of the hot cathode gas filled type. These rectifiers may be divided into two general classes in one of which the gas is mercury vapor and the other of which employs an inert gas, such as neon or the like. Either type of rectifier may be used provided the circuit is adapted to the particular controlling conditions characteristic of these tubes. It is characteristic of both these types of tubes that they require a definite negative or positive grid voltage to prevent plate to cathode current flow and that if this voltage is made sufficiently positive so that flow of plate current is once started, this flow continues even though the grid voltage is thereafter made negative to or beyond a point which would have prevented the flow of current from cathode to plate if it were not already flowing. Where an alternating potential is impressed on the plate, however, reversal of this potential causes the plate current to cease so that if the grid voltage is then sufficiently negative plate current will not again flow on the positive half of the next cycle of the input circuit. The mercury vapor filled tubes require a grid voltage more positive than a critical negative value to open while the neon filled tubes require a positive grid bias instead of a negative bias at the critical point. In the following description and as shown in the drawings, the circuits are arranged for use with the mercury vapor filled type of tube, but the neon or other inert gas filled tube is applicable provided the proper grid voltage conditions are provided for in the circuit connections and values.

Referring to the accompanying drawings.

The whole apparatus comprises essentially five main parts: the input circuit, the rectifiers, the output circuit, the major control circuit, and the supplemental or compounding control circuit. Details of these circuits may vary widely depending on the source of input power, the number of rectifiers to be employed, the nature of the load which the system is to control, and the amount and direction of variations of output voltage in accordance with the output power which is desired. A typical circuit illustrated in Figures 1 and 2 operating with two rectifiers from a 220 volt 60 cycle single phase power circuit, and providing up to five amperes direct current output at any desired voltage up to 250 volts and having a wide range of control of rate of change of output voltage with load variations, will serve to illustrate the general functions of the parts of the circuit.

Figure 1:
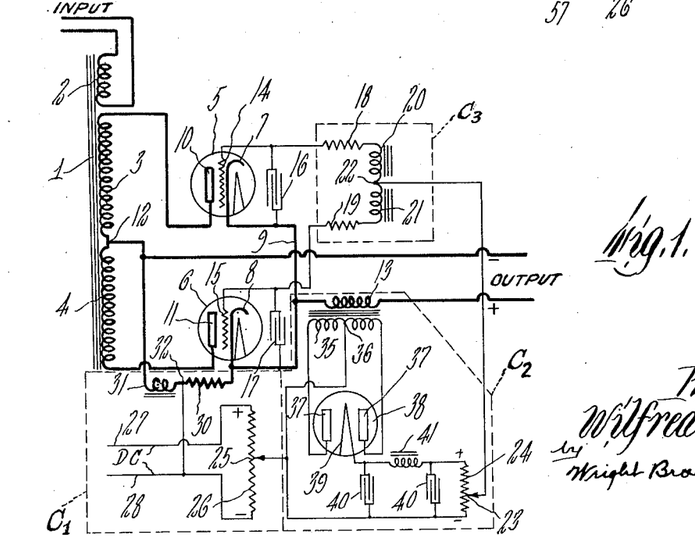
Figure 1 illustrates a simplified form of this invention, considerable detail being omitted for the sake of clarity of the major functions, this diagram showing a direct current output circuit and a single phase alternating supply circuit.

Referring first to Figure 1, the input circuit consists of a transformer 1 including a primary winding 2 and a divided secondary winding having the parts 3 and 4. Two rectifier tubes 5 and 6 are employed, the cathodes 7 and 8 of which are connected together by the lead 9. These cathodes are heated as from a common filament supply winding, which is not shown in this figure. The plates 10 and 11 are connected directly to opposite ends of the secondary windings 3 and 4. The output circuit is connected between the lead 9 which is common to the two cathodes 7 and 8 and the midpoint 12 of the secondary of the supply transformer. This results in the rectifiers operating on opposite halves of the cycle, providing an output of pulsating direct current with 120 pulsations per second. In the diagram of Figure 1 no output filter to reduce and smooth over the pulsations of this direct current output is shown. If the load is of such a type that these output pulsations cause difficulty, such an output filter may be provided. In the lead from the common connection 9 of the cathodes of the rectifier tubes to the output is the primary 13 of a series or current transformer. The voltage drop through this is so small as to have a negligible effect on the output circuit and though the primary winding 13 is connected into the output, this transformer is properly a part of the supplemental or compounding control circuit as will later appear.

A large part of the grid circuit of the system operates more or less as a unit together and may be regarded as the major control circuit. Starting at the grids 14 and 15 of the rectifier tubes there is a small by-pass condenser 16, 17, between each grid and the corresponding cathode in order to reduce the variations of grid voltage which might result from transient surges of power in the system. A fixed resistor 18, 19 connected to each grid and by-pass condenser serves to limit the current flow in the grid circuit both during the time when its tube is in a state of ionization with resultant low impedance between the cathode, grid, and plate and also during the time when the plate potential is negative, and when the grid may become more or less positive with respect to the cathode. The side of each resistor away from the grid connects to a source of alternating potential, a portion of which is indicated at 20 and 21 respectively. This potential is of about 30 volts R. M. S., of the same frequency as that of the alternating potential applied to the plates of the rectifiers, but lagging the corresponding plate potentials by 90 electrical degrees. Taken from a different viewpoint, with the operating voltages applied to the circuit as a whole but with the rectifier tubes passing no current, there will be an alternation of the plate to cathode potential and also an alternation of the grid to cathode potential both of the same frequency, but the grid to cathode potential will reach its positive peak one quarter of a cycle after the plate to cathode potential has reached its positive peak; i. e., when the plate to cathode potential is passing through 0 and is decreasing toward a negative value. The source of this alternating potential is not shown on the diagram of Figure 1 for the sake of clarity, but it may be provided from any of several sources some of which will be described in connection with other figures of the drawings. There is a separate supply of this alternating potential for each grid circuit so arranged as to provide grid potential for each rectifier tube in the proper phase relation to the plate potential applied to that tube. The terminals of the two alternating potential sources 20 and 21 remote from the grids of the rectifiers are connected together at 22 and to the slider 23 of a potentiometer 24 forming at its ends the terminals of the supplemental or compounding control circuit, a portion of which derives energy from the current transformer primary 13 in the output circuit, as will later be described. For the present it may be assumed that the slider 23 of the potentiometer is moved to the negative end, thus connecting the common point 22 of the alternating potential grid supply to the slider 25 of the main controlling potentiometer 26. This main control potentiometer is connected to a source of direct current from the leads 27 and 28. This may be any suitable direct current source; but, for simplicity in this diagram, this source has been merely conventionally indicated. Certain specific sources will be described later in connection with other figures of the drawings. From the negative end of the controlling potentiometer 26 there is a connection through a resistor 30 to the positive side of the output circuit and a connection through a reactance 31 to the negative side of the output circuit. This connection completes the major control circuit the operation of which is as follows.

Starting from the lead 9 which is common to the two cathodes 7 and 8 it will be seen that there is a resistor 30 and a reactor 31 connecting to the negative side of the output circuit. The resistance of the resistor 30 to the flow of direct current is large compared to that of the reactor 31 so that the direct current potential of their common point 32 is essentially that of the negative side of the output circuit. However, due to the high impedance of the reactor 31 to variations of current flow through it, the variations of this potential will be materially less than that which exist across the output circuit. In other words, this resistor and reactor form what might be termed a filter and the average direct current potential at the point 32 will differ from the potential of the cathodes 7 and 8 by an amount proportional to and nearly equal to the potential across the output circuit. The higher the potential across the output circuit, the more negative will this common point 32 become with respect to the cathodes 7 and 8. To this voltage at the point 32 is added a constant but controllable direct current voltage from the main control potentiometer 26 by the setting of the slider 25. It will be noted that the negative side of this potentiometer is connected to the point 32 so that these voltages really subtract so that the potential of the slider 25 of the control potentiometer with respect to the cathodes 7 and 8 is the difference between the potential across the control potentiometer from the slider 25 and the potential across the output circuit. Furthermore, the higher the output circuit voltage, the more negative is the slider 25 with respect to the tube cathodes. Since the slider 25 connects through a source of constant alternating potential at 20 and 21 with the grids of the tubes, the greater the output potential, the more negative becomes the average potential of the grids with respect to the cathodes and the less current the rectifier tubes will pass. This in turn tends to decrease the output potential. Looked at from a different viewpoint, since the output potential is always roughly equal to the voltage across the control potentiometer, a small percentage change in output potential results in a large percentage change of the difference between this and the control potential. This direct current with the added constant alternating current potential grid bias thus acts so that any increase in output voltage tends to make the grids of the tubes more negative, delaying the time of ignition of the arc in each positive half cycle of plate-cathode potential and thus decreasing the time of current flow through the tubes and therefore the average current, and, as a result, tends to reduce the variation of output voltage which started the train. This major control circuit alone will serve to control the tubes throughout their entire range. However, with sufficient alternating current voltage in the grid circuit to ensure smooth operation, there will be a drop in voltage in the output circuit of about 30 volts from no current to full current which is fairly constant regardless of the potential at which the output circuit is operated.

Figure 2:
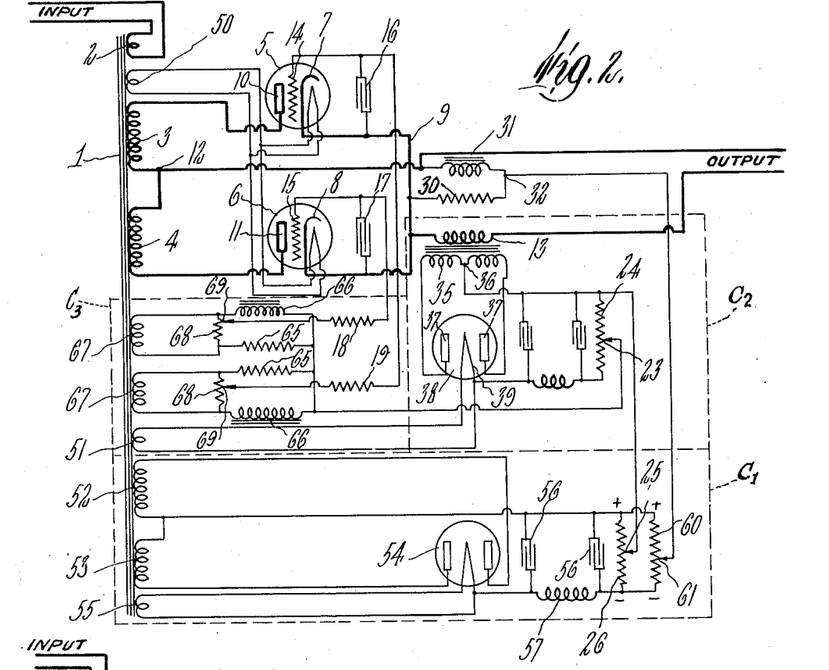
Figure 2 is a diagram of the type shown in Figure 1, but showing sufficient connections for practical operation.

The supplemental control or compounding circuit is included in the system in order that instead of a constant and uncontrolled decrease of output voltage with increase of output current, the output voltage may be held constant or caused to increase with increase of output current. This feature of possible increase is of great importance. In many cases there is line drop or a resistance drop, or both, within the load circuit, and in order that the performance of the load circuit devices shall be as constant as possible, it is necessary that the output voltage increase as the load increases to compensate for line drop or resistance drop within the load circuit or both. This is particularly true where the load happens to be a direct current shunt motor, and means by which this supplemental control may be derived in order to compensate for the IR drop of a motor armature circuit will be later described in connection with Figure 3 of the drawings. A wide variety of supplemental control or compounding circuits may be used, one of which is shown in Figures 1 and 2, and others of which are shown in Figures 3, 5, 6, and 7.

The supplemental control or compounding circuit shown in Figure 1 is very simple but flexible. It so happens that, due to the pulsating nature of the direct current in the output circuit, the potential across the series transformer primary 13 is quite accurately proportional to the average direct current flow in the output circuit quite independent of its voltage. The secondary 35 of this series transformer is provided with a midtap 36. The ends of this secondary 35 are connected to the plates 37 of a double element rectifier tube 38, such for example as is commonly used in the power supply system of radio receiving sets operating on alternating current. This tube acts as a full wave rectifier and results in producing a pulsating direct current between the filament 39 of the tube and the midpoint 36 of the transformer secondary. A simple filter with two condensers 40 and a reactor 41 reduces the amount of the pulsations and as a result there is applied across the potentiometer 24 a pulsating direct current potential proportional to the current in the output circuit. The filament heating circuit for this rectifier tube 38 has been omitted from the diagram for the sake of simplicity. A portion of this direct current potential, the proportion being determined by the setting of the slider 23 is applied between the main control potentiometer slider 25 and the alternating current potential from the units 20 and 21 supplied to the grids. The connection is of such polarity that the higher the potential of the compounding circuit, the more positive becomes the average potential of the rectifier grids and the current flow in and voltage across the output circuit. By means of this compounding circuit, therefore, an added voltage is produced proportional to the output current, which is applied in a manner so that it has exactly the same effect as if the main control potentiometer 26 were advanced toward higher voltage with increase of output current. By positioning the slider 23, this added voltage can be so set that the output voltage, instead of decreasing as load increases, may be reduced, may be made stationary, or even increased as the output current varies from 0 to full load. This effect is independent of the voltage at which the output circuit happens to be operated as controlled by the main control potentiometer slider 25. This is particularly useful as line drop and resistance drop through load effects are also almost always proportional to the current alone and independent of voltage.

The main control circuit is shown situated within the dotted line enclosure C1, the compounding circuit mechanism within the dotted line enclosure C2, and the source of alternating current grid voltage within the enclosure C3, in order to facilitate examination.

It will be noted that the phase of the necessary out of phase alternating current component of the output circuit controlling grid potential remains substantially constant, actual control, both main and auxiliary automatic, being entirely through variable direct current voltage.

Figure 2 is the same as Figure 1 except that all the connections for practical operations are shown, and the corresponding parts are therefore correspondingly numbered in this figure. The filaments of all the tubes are shown as heated by current direct from the main transformer, the main control rectifiers deriving their heating current from the secondary 50 and that for the full wave rectifier for the supplemental or compounding circuit being heated from the secondary coil 51. Power for the direct current control circuit including the main control potentiometer 26 is from the transformer coils 52 and 53 which supply plate current to the full wave rectifier 54, the filament for which is heated from the transformer secondary 55. Rectified current from the full wave rectifier 54 is supplied to the terminals of the main control potentiometer 26 through the filter comprising the condensers 56 and the reactance 57. The main control potentiometer as shown in Figure 2 is provided with a resistor 60 across it and the connection from the cathodes 7 and 8 part way across this resistor as at 61. This is done so that the net voltage across the potentiometer is divided so that instead of running from 0 to a positive value it runs from a negative value to a positive value of the same total extent. This is done because of the negative control characteristic of the mercury vapor filled rectifiers and the alternating current in the control circuit, it being necessary that the main control voltage for the grids shall be about 20 volts negative in order to bring the output voltage to 0. The supply circuits for the alternating potential comprise for each tube a resistance 65 and a reactor 66, of equal impedances at the frequency used, deriving energy from the transformer secondaries 67. Across these transformer secondaries are the potentiometers 68. It may be shown that the potential from the midpoint of each of these potentiometers 68 to the common point of the fixed resistor 65 and reactor 66 is 90 electrical degrees out of phase with the potential across the transformer secondaries 67, since it is supplied from the same transformer, in the same phase relation to the cathode to plate potential. The phase taken from each potentiometer 68 may be varied by the setting of the potentiometer slider 69. The resistors and reactors are connected on opposite sides of the output circuits serving the two grids so that the two alternating current potentials on the grids are opposite, as they should be with the two tubes operating on opposite half cycles of the supply potentials. The adjustable feature derived by the use of the potentiometers 68 is useful. Current limiting resistors 18 and 19 corresponding to those similarly numbered in Figure 1 and the by-pass condensers 16 and 17 have the effect of shifting the phase of the applied alternating potential so that it is necessary in order that the potential on the grid be at the desired phase to adjust the potentiometer setting to overcome this phase shift. Furthermore, the phase position for best performance is just slightly more than 90° lag and varies somewhat with the nature of the load. Moreover, the supply of direct current to the auxiliary compounding potentiometer 24 from the compounding circuit within the dotted line enclosure B is imperfectly filtered so that there is a certain amount of resultant alternating current voltage in the direct current voltage from these sources. In practice it is quite easy to compensate for all these by adjusting the slider 69 of the phase control potentiometers 68 to produce smoothest operation of the system as a whole.

*Three-phase input-direct current motor control system*

Figure 3:
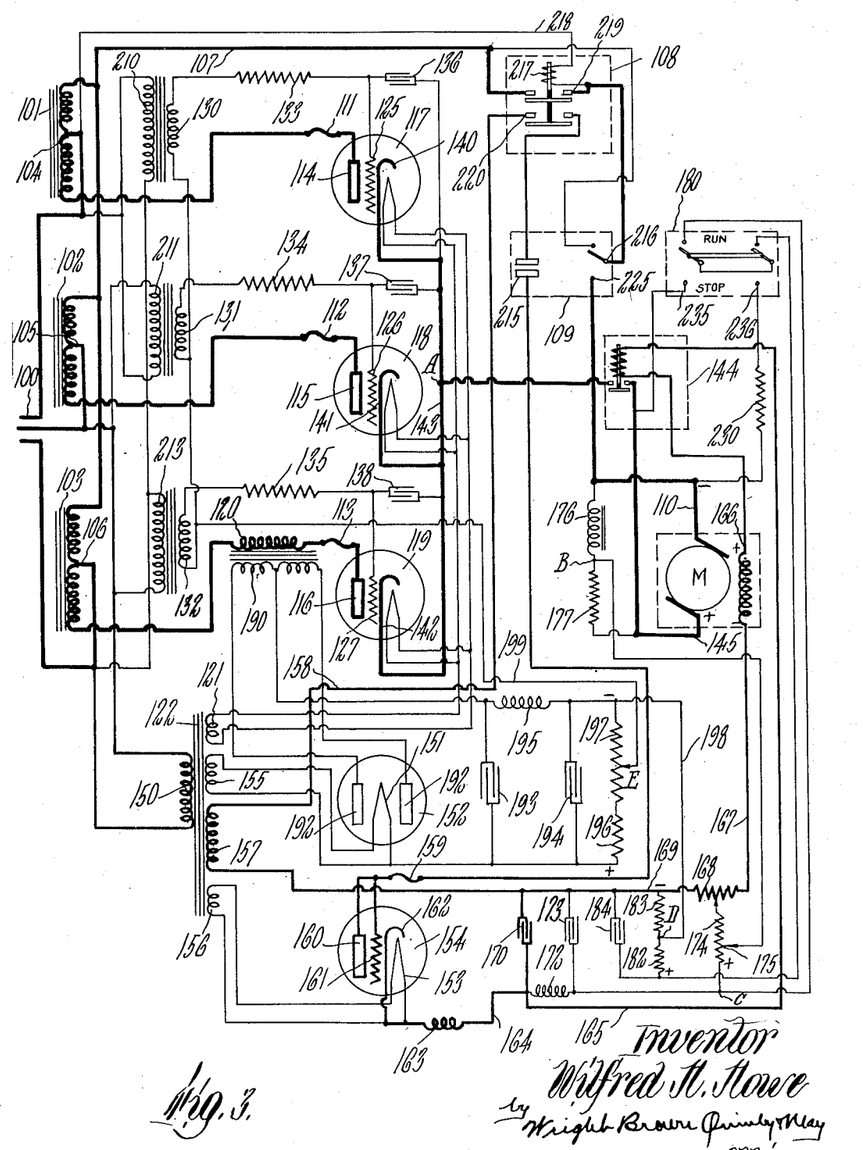
Figure 3 is a diagram showing a three phase power supply arranged for operating a direct current motor in accordance with this invention.

This is shown diagrammed in Figure 3. Input power is supplied at 220 volts 60 cycles three-phase from the leads 100 to three auto transformers at 101, 102 and 103. These auto transformers are Y connected with the input connected to the low potential taps at 104, 105, and 106. The output voltage from these transformers is therefore increased over the input being 550 volts between wires or 320 volts to the neutral. The common point of the Y leads through the conductor 107 to the hold relay 108 and through this to a time switch at 109, both of which will be more fully described, and thence to the negative terminal 110 of the motor armature M. The high voltage or outer terminals of the auto transformers 101, 102 and 103 go through fuses 111, 112, and 113 to the plates 114, 115 and 116 of the power rectifier tubes 117, 118 and 119. Inserted in one of these plate connections, as in the connection to the plate 116, is the primary 120 of a series transformer which operates the compounding circuit similarly to the series transformer having the primary 13 of Figures 1 and 2. The filaments of the tubes 117, 118, and 119 are connected together and are supplied with current through the secondary 121 of the auxiliary transformer 122. The grids 125, 126 and 127 are fed through a resistor-capacity feed from the phase transformer secondary windings 130, 131, and 132 which transformers will later be described. These resistor capacity feeds comprise the resistors 133, 134, and 135 and the condensers 136, 137, and 138. The cathodes 140, 141, and 142 are connected together by the lead 143 and to this is a connection at the point A through the armature relay 144 to the positive terminal 145 of the motor armature. Thus the main power circuit is from the common cathode connections of the tubes at A through the motor armature back to the common point of the Y connected transformers 101, 102, and 103, through these transformers to the respective plates of the rectifier tubes 117, 118 and 119 and back to the common cathode connection. The auxiliary transformer 122 is a single phase unit having its primary 150 fed at 220 volts from one phase of the main supply line 100. Besides supplying filament current for the rectifiers 117, 118 and 119 as previously described, it supplies energy for the filament 151 of a rectifier tube 152 and for the filament 153 of a rectifier tube 154, these filament currents being taken from the secondaries 155 and 156, respectively. Another secondary 157 supplies alternating current to be rectified by the rectifier 154 for the main power supply to the motor field circuit and the control system as will now be described.

From the upper end of the field supply winding 157 there is a connection through the line 158 leading to the hold relay 106 and the time delay switch 109 through a fuse 159 to the anode of the rectifier tube 154. As shown this rectifier tube has a plate 160 and a grid 161 connected together to serve as an anode but any rectifier tube capable of supplying one ampere at 300 volts could be used. The cathode 162 of this tube connects through a filter choke 163 through the lines 164 and 165 and the coil of the relay 144 to the positive side of the motor field 166, the negative side of which connects through the leads 167, resistor 168 and lead 169 to the lower end of the transformer secondary 157. Connected across the leads 164 and 169 is a condenser 170. The field supply thus consists of the transformer secondary 157, the choke 163 and the condenser 170 across which is connected the output circuit which consists of the field winding 166 of the motor and the current limiting resistor 168. Across this output circuit is connected the direct current control circuit as follows:

It connects to the positive side of the field supply circuit through the choke 172 from which there is a condenser 173 connected back to the negative side of the output. Also connected to this choke 172 is the positive end of the main speed control potentiometer 174. The negative terminal of this potentiometer connects part way of the resistor 168 which limits the field current of the motor. The slider 175 of this potentiometer 174 connects to the armature filter comprising the iron cored inductance 176 and the resistance 177 which are arranged in series, this connection from the slider 175 being at their common point at B. From the positive terminal of this potentiometer 174 there is a connection through the run contacts of the operating switch 180 to the positive of a fixed voltage divider having the two fixed resistors 182 and 183. The resistor 182 may be 1000 ohms and the resistor 183 15,000 ohms. Across this voltage divider is a condenser 184. The negative end of the voltage divider and this condenser connect to the negative of the field supply output circuit. The tap off point of the voltage divider at D is connected to the negative end of the compounding circuit potentiometer 197 which will be later described.

Referring now to the inductance 176 and the resistance 177 connected across the armature circuit it will be noted that the positive side of the motor armature is connected through the relay 144 to the point A which is a common cathode connection of the tubes 117, 118, and 119 and it is also connected to the resistance 177, while the negative side of the motor, that is the side connected to the common point of the transformers 101, 102, and 103, is connected to the inductance 176. The direct current flow impedance of the reactance 176 is negligible compared with that of the resistance while to the alternating component of the output power impedance of the resistance 177 is small compared with that of the reactance 176. As a result the common point B of the resistance and reactance will be at very nearly the same direct current potential as the negative side of the motor armature while as far as alternating current effects are concerned the point B will be almost the same as the positive side of the motor armature. In other words, compared with the potential of the positive side of the motor armature, or the common cathodes to which it is connected, this point B will be negative by almost exactly the direct current potential across the motor armature M and this difference of voltage will be almost pure direct current potential with no appreciable alternating current value. This system thus transmits the direct current potential of the armature but blocks the alternating current potential. On account of certain resonant effects which tend to develop in circuits controlled in this manner, a pure resistance-reactance filter without use of capacity is desirable.

*Compounding circuit*

The compounding circuit derives its input from the series transformer having the primary 120 similarly to the compounding circuit previously described in connection with Figures 1 and 2. The output of this series transformer through the secondary 190 is proportional to the alternating component and hence the direct current output of the rectifier tube 119 and since the rectifiers 117, 118, and 119 share the load equally, it is proportional to the total output current. The output winding 190 is midtapped, the outer ends going to the two plates 192 of the rectifier 152 which is a full wave rectifier. The filament of this rectifier 151 connects to the positive side of a filter circuit comprising two condensers 193 and 194 and the inductance 195, and across the condenser 194 is connected the auxiliary or compounding potentiometer which comprises two resistors 196 and 197. The resistance 196 is fixed and the resistance 197 is provided with a slider E. The negative end of this potentiometer connects through the lead 198 with the point D of the fixed divider resistance and the slider E connects through the lead 199 with the phase transformer secondaries 130, 131 and 132 which will be further explained later.

Omitting for the moment the phase transformers and considering only the direct current potentials, the potential of the point B is negative with respect to the potential of the point A by an amount equal to the direct current potential across the armature of the motor. The potential of the point C is positive with respect to the potential of the point B by an amount proportional to the setting of the slider 175 of the main speed control potentiometer 174. When the slider 175 is at the positive end this voltage is 0, and when the slider is at the negative end, this voltage is at its maximum. The potential of the point D is negative with respect to the potential of the point C by a fixed amount, in the present instance about 20 volts determined by the ratio of the resistances 182 and 183 of the fixed divider and the direct current potential of the control circuit. The potential of the point E is positive with respect to the potential of the point D by an amount proportional to the current flow in the armature of the motor. Thus the direct current potential applied to the grids of the tubes 117, 118, and 119, which is substantially the same as the potential of the point E, as compared with the potential of the cathodes of these tubes which is the potential of the point A, is equal to the sum of the potential of the main speed control potentiometer, plus the potential of the compounding circuit, minus the sum of the fixed voltage divider potential, plus the voltage on the armature of the motor. Thus, as in the more simple circuit previously described, the main control is effected by the difference of the motor voltage and the control direct current voltage, any variation in circuit conditions being accompanied by a shift of the net direct current potential on the grids in such a manner that the plate current flow as controlled by the grids shall result in a load voltage having a fixed relation to the controlling direct current voltage. To this is added the voltage from the compounding circuit so that the difference between the load voltage and the direct current voltage can be made to vary with load in any desired fashion resulting in a load voltage which may be constant regardless of load or which may either increase or decrease as the load increases.

*Alternating grid potential*

In addition to this direct current potential an alternating current potential of the same frequency but out of phase with the input voltage is impressed on the tube grids through the phasing transformers 130, 131, and 132. The primaries of these transformers 210, 211, and 213 have impressed thereon the voltage of the input lines 100 and are connected in delta thereto. The secondaries 130, 131, and 132 are of a lower voltage, say 30 volts, and are connected in Y. The center point of the Y is connected to the slider E while, as previously described, the outer ends of the secondary Y connects through resistors to the grids 125, 126, and 127. These resistors limit the current flow in the grid circuits. This is necessary less for the protection of the tubes than to keep the current in the direct current control circuits and compounding circuits low so as to afford control with small power dissipation and small size control elements. The condensers 136, 137, and 138 together with the resistors 133, 134, and 135 tend to reduce the effect of momentary surge currents and tend to make the three rectifier tubes divide load equally. This connection of the transformers causes the alternating potential applied on the grids to lag the alternating potential supplied by the main power supply transformers 101, 102, and 103 for any one tube by an angle of 90° under no load conditions. In practice the grid resistor and condenser tend to shift the phase somewhat and also the load applied to the main transformers causes a shift in position of the neutral from the electric center of the system, but the net effect is one of smooth control throughout the entire range of operation.

*Operation*

Assume that the mechanical load on the motor increases. Since the rectifiers and the input circuit are at the moment of increased load delivering a constant current to the motor, the torque of the motor is likewise constant and an increase of resisting torque in excess of the constant driving torque tends to reduce the speed of the motor. A decrease in the speed of the motor results in a decrease of generated voltage within the motor and a similar reduction of the voltage across the armature terminals. Since the armature voltage is applied in the grid cathode circuit in a negative sense, a decrease in this voltage causes the grids of the tubes to become more positive with respect to the cathodes. This increase in the grid potential causes the rectifiers to open earlier in the cycle permitting a larger average current flow. The motor current thus increases until the increased torque thus produced is equal to the torque of the load, at which time the speed of the motor becomes steady. This new position of equilibrium, however, is at a point where the grids are more positive with respect to the cathodes than in the previous condition to provide for the increased current. This increased positive grid potential must be sufficient not only to permit the increased current flow but also to overcome resistance and impedance drops within the main power supply circuit. Unless provided for, this would mean that as the load increases the voltage applied to the armature would decrease by an amount sufficient to provide for the necessary increased positive grid potential. Furthermore, as the armature current increases, the internal armature resistance drop within the motor likewise increases. Since the generated voltage of the armature, which is directly proportional to speed, is equal to the difference between the applied armature voltage and the armature resistance drop, this generated voltage would decrease with respect to the applied voltage as armature current increases thereby causing a further decrease of motor speed. The compounding system is a means of offsetting these effects tending to reduce motor speed. By means of the compounding system the potential of the grids of the tubes with respect to the potential of the cathodes is caused to increase with increase of current flow. By a proper setting of the compounding potentiometer slider E, the increase of grid potential resulting from the compounding may be set at an amount sufficient to exactly offset the two effects tending to reduce the motor speed as previously described, so that the motor is run at constant speed regardless of load, but both these effects tending to reduce speed are proportional to current and are nearly independent of the voltage at which the system is operating. Similarly, the compounding component depends almost entirely on current flow so that this proves equally effective for maintaining constant motor speed throughout a twenty to one range of motor speed without adjustment of the compounding.

Here again, it will be noted that the phase of the out of phase alternating current component of the grid potential remains substantially constant, the actual controls both main and auxiliary automatic being entirely through direct current voltage.

It will be apparent that the compounding potentiometer 197 may be set to cause decrease of motor speed with increased load or may be set to cause increase of motor speed with increase of motor load as well as to cause the motor speed to remain constant.

*Safety circuits*

It is necessary that provision be made whereby the filament heaters of the power rectifiers 117, 118, and 119 be turned on for a sufficient period, say five minutes, before current flow through the rectifiers may commence. The circuit to accomplish this, as shown, is as follows:

The switch 109 hereinbefore mentioned is what is known in the trade as a "mark time" switch. This is a combination of clock work with an ordinary snap switch so that when the switch is turned to "on" position the delay of the proper duration occurs before the connection is established. Turning the switch in the up or "off" position results in instantaneous break in connections. The left hand contact 215 in the time switch is so controlled. The right hand switch portion 216 is a single pole double throw switch of ordinary construction. When the main power supply is turned on, placing the time switch 109 in the off position opens the contact at 215 and swings the single pole double throw switch 216 to its upper position closing the connection from the line 107 which is the common point of the main power supply transformers 101, 102, and 103 to the operating coil 217 of the hold relay 108 and through this coil to one side 218 of the main power supply. This closes the hold relay reestablishing connection from the line 107 through the contacts at 219 with the lower end of the relay coil 217 independent of the time switch and causes this hold relay to self hold as long as the main power supply is uninterrupted. Closing this hold relay also closes a connection at 220 from the upper end of the field supply transformer winding 157 to the delay contact 215 of the time switch. The operating lever of this time switch is now placed in the "on" position which closes the circuit through the switch 216 and its lower contact 225 from the common point of the main supply transformer line 107 to the negative side of the motor armature. However, the armature relay at 144 is open so that no current can flow through the main supply rectifiers 117, 118, and 119. Five minutes later the delay contacts 215 of the time switch close thereby completing the circuit of the auxiliary supply transformer 157 to the anode of the field rectifier tube 154 and energizing the field and the control circuits. When the field current is built up to an adequate value, this current actuates the armature relay 144 closing the connection between the common cathode connection A and the motor armature at 145 and permitting the flow of power in the main operating circuit. Any interruption in the main power circuit causes the hold relay 108 to drop out. It is then necessary to reset this by turning the time switch 109 to the off position after which there is a delay interval before the time contact again closes. Thus adequate time is provided for starting up at any time when the main power circuit is shut off. The time switch when thrown off breaks the armature as well as the field circuits thereby preventing excessive armature current flow during the delay of opening of the relay 144. The armature relay automatically provides for interruption of the armature current at any time that the field circuit may be accidentally opened.

*Starting and stopping circuit*

With the safety switches all closed the operating switch 180 on the run position completes the circuit between the positive side of the main speed control potentiometer 174 and the positive of the fixed voltage divider 182, 183 and provides for normal operation. When the operating switch 180 is turned to stop position, this connection is opened which leaves the voltage divider 182, 183 connected to the circuit only at its negative end. In other words, the take-off at D assumes the potential of the negative side of the control circuit. This potential is about 300 volts negative on the positive side of the control circuit so that the point D becomes 300 volts negative from the point C instead of the previous 20 volts negative and as a result the grids of the rectifier tubes 117, 118, and 119 become 280 volts more negative than with the operating switch 180 in the normal or run position. This additional negative potential is sufficient to prevent the rectifier tubes 117, 118, and 119 from passing any current at all and the armature power is thus cut off from the motor. At the same time placing the operating switch 180 in the off position closes a connection from the positive side of the armature through a resistor 230 to the negative side of the armature thereby providing dynamic braking by short circuiting the armature. The resistor 230 lowers the current flow through the armature and prevents too sudden stopping of the motor but may be omitted where sudden stopping and heavy armature current are not objectionable. When the operating switch 180 is returned to the run position an appreciable time elapses during the flow of charging current to the condenser 184 which provides a small time delay and allows the motor armature to reach an appreciable rotation speed before full voltage of the control circuit is applied to the system. The run contacts of the operating switch 180 handle a very small current, only about 20 milliamperes feeding to a resistive-capacity circuit so that both current flow and sparking are almost entirely negligible. The dynamic braking contacts 235 and 236 carry a considerable current momentarily after closing. However, the motor decelerates so rapidly that it is practically impossible to open these contacts again after closure before the current flow has fallen to a small value. Thus a light duty operating switch without quick break contacts is adequate for this service.

*Single phase input-single phase output system*

Figure 4:
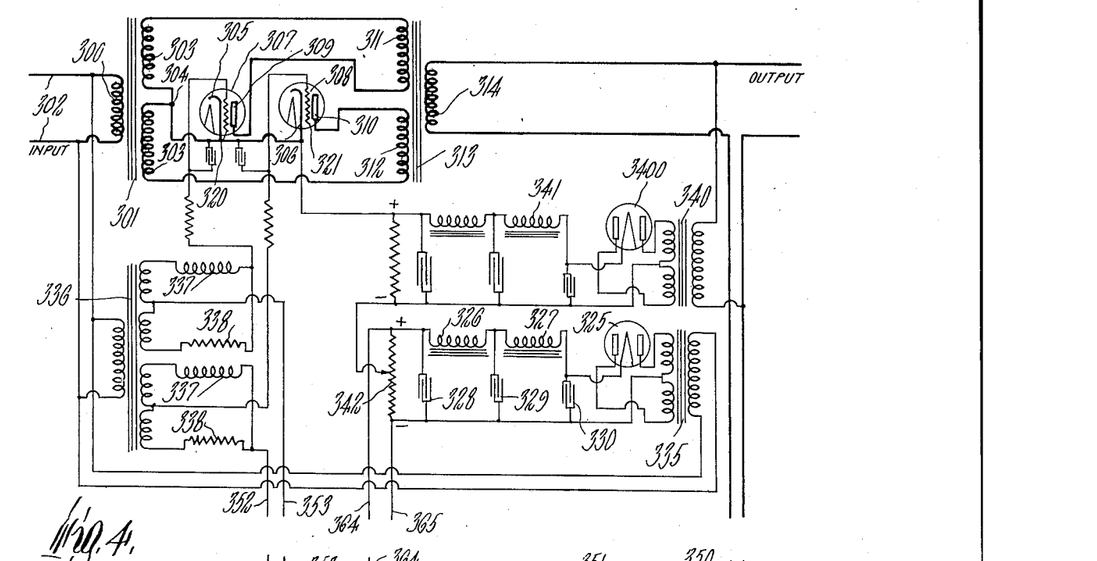
Figure 4 shows the invention diagrammatically as applied to an alternating current output circuit as well as an alternating current input circuit and with connections for the attachment of a load compensating or compounding circuit.
Figure 5:
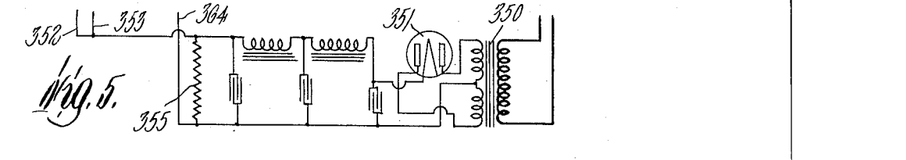
Figures 5, 6, and 7 are diagrams of various load compounding circuits particularly arranged for use with the diagram of Figure 4.
Figure 6:
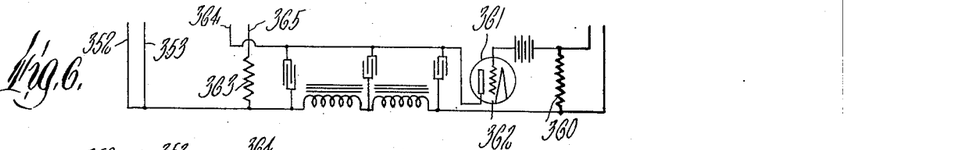
Figure 7:
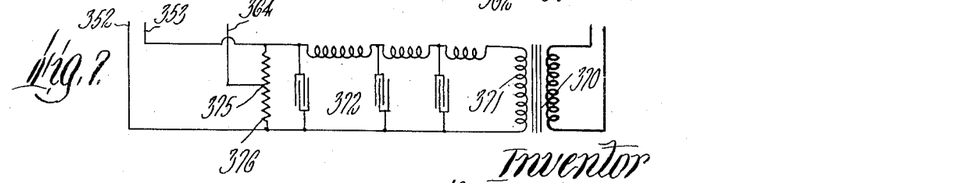
Figure 8:
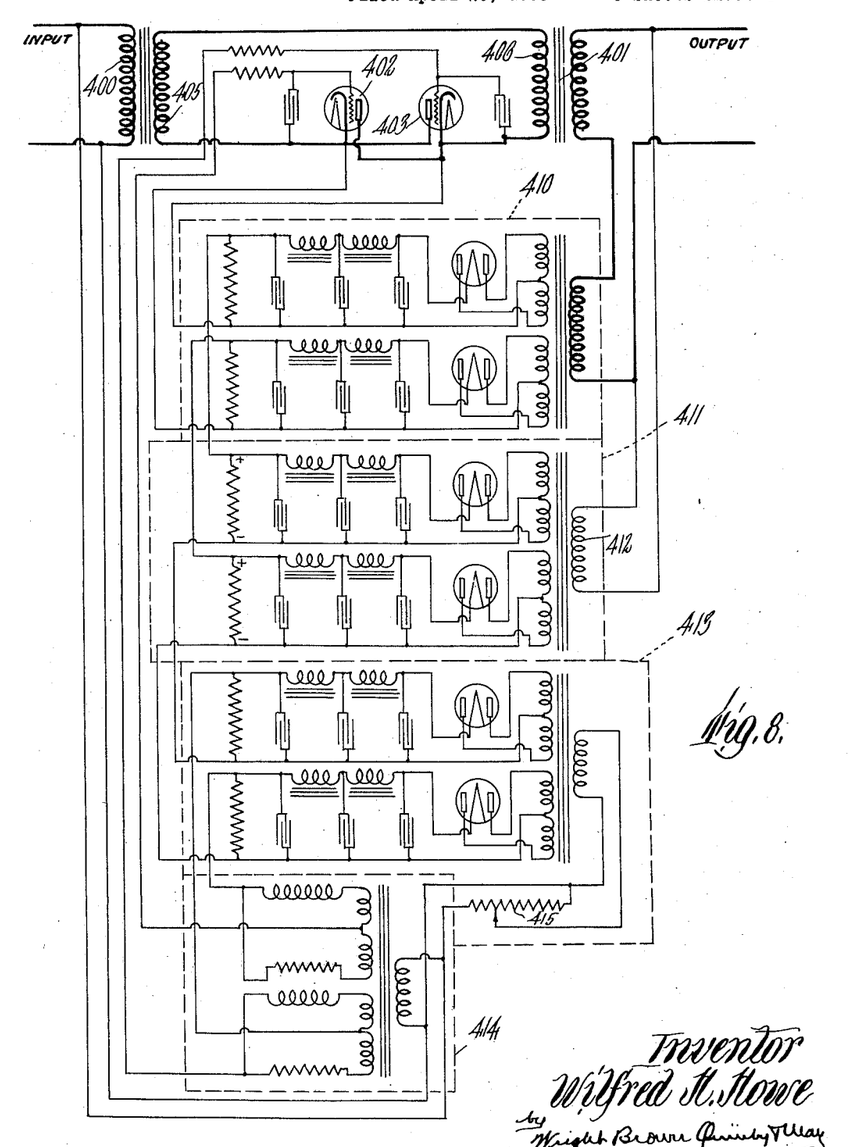
Figure 8 is a diagram of a different arrangement utilizing the general principles illustrated in Figure 4.

Two arrangements of this type are illustrated in Figures 4 and 8 respectively, Figures 5, 6, and 7 illustrate different types of compounding circuit which might be used and while shown as connectible directly into the diagram of Figure 4 their general schemes are not limited to the circuit of this figure. Referring first to Figure 4, single phase alternating current is fed into the primary 300 of a transformer 301 through the lead wires 302. The secondary 303 of the transformer 301 is midtapped as at 304, this midtap being connected to the cathodes 305 and 306 of the two power controlling rectifier tubes 307 and 308. The plates 309 and 310 are connected to the two primaries 311 and 312 respectively of the output transformer 313. The other ends of the primaries 311 and 312 are connected to the ends of the secondary 303 of the input transformer 301. This is the main power circuit complete, the output being taken from the secondary 314 of the output transformer 313. It will be apparent that if the rectifier tubes are wide open, one transformer feeds directly to the other, one half secondary of the input transformer and one primary of the output transformer being in operation every half cycle. If the rectifier tubes are less than wide open, that is if their grid potential is held below the critical value for a part of the positive plate potential time, then less than full current will flow. The potential in the output circuit will depend on the proportion of each cycle during which the rectifier tubes are open and also on the amount and power factor of the load. If a constant or controlled potential in the output circuit is desired with varied output load then it will be necessary to regulate the grids of the tubes in such a manner that the tubes will be open a sufficient proportion of each cycle to produce this voltage with the then existing condition of load. The manner of controlling the grids 320 and 321 of these rectifier tubes to accomplish this regulation is essentially the same as in the other systems previously described. Some slight variations are involved through the use of an alternating current output circuit. There are also some possible variations in the method of operation. As in the previous systems described, however, there is a source of alternating current potential component for the grid circuit of constant phase and magnitude of the same frequency as that of the input power but lagging the plate to cathode potential by 90° in phase angle. For this alternating current component a magnitude of between 25 and 100 volts is usually adequate. To this alternating current component which is constant is added a control component consisting of three parts: (1) a direct current component of variable magnitude variations of which cause a proportional variation in the output voltage; (2) a direct current component proportional to the output voltage obtained through a rectifier which opposes the controlling direct current component; (3) a compounding component which may be either alternating current or direct current derived from output current and so arranged as to correct the resultant of the other components to produce net grid potential which shall allow the rectifier tubes to open at the proper point in each cycle to produce correct output voltage.

The controlling direct current is shown as obtained from a rectifier 325 and a filter system comprising the chokes 326, 327 and the condensers 328, 329, and 330, power being obtained from the input voltage through the transformer 335. The alternating grid component is obtained from the input through a transformer 336 and a resistance-reactance system comprising the reactance 337 and the resistance 338 for each of the tubes 307 and 308, which produces an alternating potential grid lagging the input circuit potential by 90°, which is the potential applied between the plate and cathode of each of the rectifier tubes 307 and 308. This alternating current grid supply is shown double, one for each tube, for since the two tubes operate on opposite halves of the cycle with plate potential at 180° to each other, it is necessary that the grid potentials be also at 180° to each other. The second direct current grid potential component is derived from the output potential through the transformer 340 and rectifier 3400 with a suitable filter indicated generally at 341. The compounding circuit is not shown in this figure though connections therefor are shown at 352, 353, 364, and 365. There is applied to the grid of each tube a constant alternating current voltage plus a variable direct current voltage, this direct current voltage being the difference between controlling direct current from the main control potentiometer 342 and the direct current from the rectifier filter system connected to the output through the transformer 340. If the output alternating current potential decreases the direct current obtained from it decreases in the same proportion, thus decreasing the amount of direct current subtracted from the main control potentiometer 342 and thereby increasing by this amount the direct current potential of the grids of the rectifier tubes 307 and 308. This increase of potential on the grids causes the rectifier tubes to open at an earlier point in the cycle thus passing more current and tending to raise the output voltage. However, due to the voltage drop in the rectifier tubes and the transformers and the increased direct current necessary for greater opening of the tubes at an earlier point in the cycle, this alone would not serve to keep constant the potential in the output circuit. To overcome this difference the compounding circuit is introduced.

*Compounding circuits*

Three types of compounding circuit are shown in Figures 5, 6, and 7. That shown in Figure 5 is quite similar to that used in the direct current output circuit system as in Figures 1 and 2. A series or current transformer 350 in the output circuit develops a secondary potential proportional to the input current. This alternating current potential is applied to a rectifier filter system including the rectifier 351, converting it to a proportionate direct current potential, and this direct current potential is then added to the grid potential circuit as through the lead wires 352, 353 and 364. By proper selection of the transformer ratio and the resistance 355 across the output of the grid compounding circuit filter, the output voltage may be caused to remain constant or to increase or decrease with change of load.

In the compounding circuit shown in Figure 6, the output current is passed through a resistor 360 and the voltage drop across this resistor is applied to the grid 361 of the amplifier tube 362. This tube is preferably of the detector or "class B" type where an alternating potential applied to the grid circuit causes an increase of flow of current in the plate circuit. The filament-plate circuit of this tube in series with a resistor 363 is connected across the direct current supply to the main control potentiometer through the leads 364 and 365. The circuit is so arranged that an increase in the direct current flow in the plate circuit of the tube 362 causes a corresponding increase of the direct current potential of the grids of the power rectifiers 307 and 308. This circuit of Figure 6 thereby behaves somewhat the same as that of Figure 5 but with two important differences. First, in the system shown in Figure 6 the compounding potential is derived from a resistance drop and is therefore proportional directly to current. In the case of the series transformer of Figure 5 the secondary potential is really developed by the change of current flow in the primary so that the control is from instantaneous rate of change of the alternating current in the secondary circuit rather than from the actual magnitude of the current. Second, in a case such as that shown in Figure 5 where the load on the secondary of the transformer is a rectifier and where there is a large amount of harmonics in the primary current of the transformer 350 the secondary potential from the rectifier filter varies not only with the current in the secondary of the transformer 350 but also with the type of load of the output circuit. This variation is not large but is a factor where accurate control is desired with a wide variation in the type of load used. The amplifier tube arrangement shown in Figure 6 therefore has advantages under such conditions. On the other hand, it is necessary to provide a reasonable grid swing on the amplifier tube 362 and this means considerable resistance drop loss in the resistor 360. In the case of high voltage relatively low current output circuits this is negligible but it becomes of considerable moment if high output current circuits are used.

In Figure 7 a third type of compounding circuit is illustrated which has alternating rather than a direct current potential. With a constant direct current applied to the grid of a tube such as 307 and 308, a change in phase and magnitude of the alternating current component applied to the grid causes a change in the time of opening of the tube during each cycle. In Figure 7, therefore, a series or current transformer 370 in the output circuit develops in its secondary 371 a current proportional to the output current. The phase of this potential, or rather the phase of the fundamental component of the complex wave of the secondary circuit, tends to lag the potential applied between the plates and grids of the power tubes 307 and 308 by an amount between 0 and 90° the amount of lag depending on the output load, but on the whole tending to decrease in angle as the power tube rectifier opening increases. A "low pass filter" system indicated generally at 372 comprises resistors, condensers and chokes with a limit slightly above the frequency of the input voltage passes the fundamental frequency, but has an impedance to higher frequencies so great that harmonics are almost entirely missing in its output. In other words, a complex wave is applied to the filter 372 which by its characteristic passes through the fundamental frequency, but filters out all higher frequencies. This filter also shifts the phase of the fundamental frequency by 225°. The output of this filter is thus a sinusoidal potential of frequency the same as that applied to the grid from the phase control circuit from the transformer 336 of Figure 4, and in phase relation to this other alternating potential such that an increase in the magnitude of the compounding circuit alternating potential causes the tubes 307 and 308 to open at an earlier point in the cycle. Thus in the circuit of Figure 7 like those of Figures 5 and 6 an increase in load tends to produce an increase in the output voltage of an amount sufficient to overcome the various drops in voltage normally introduced by this increase in load. The direct current component of control from the main control potentiometer 342 is connected to the midpoint of the output resistor 376 of this system and the connections 352 and 353 to its extreme ends. Thus the alternating potential applied from the center point 375 to the wire 353 is equal and opposite to the potential from the center point 375 to the wire 352, in other words, the compounding alternating potentials applied to the two grids 320 and 321 of the rectifiers 307 and 308 are separated by 180 electrical degrees as is necessary in order that both rectifier tubes, with their main power supply likewise separated by 180 electrical degrees shall both be affected in the same amount by the compounding potential.

*Modified single-phase input single phase output system*

Figure 8 shows a different alternating current input alternating current output circuit similar in principle to that of Figure 4 but modified in detail. In this system the main power circuit has been simplified. There are an input transformer 400 and an output transformer 401 and two power rectifier tubes 402 and 403. The input transformer has a single secondary 405 and the output transformer a single primary 406 and the two tubes 402 and 403 are connected with the plate of one attached to the cathode of the other and vice versa. Each tube acts on one half of the power cycle the two together operating to control the full main power wave. This difference in the main power circuit with its accompanying simplification of the main power transformers makes their control somewhat more complex. Since the cathodes of the two tubes, instead of being connected together, are separated by the potential drop through the tubes, it is necessary to have complete double control circuits, a complete control circuit connected between cathode and grid of each tube with the two control systems isolated from each other. This figure shows four complete double circuits for control, one for each of the four components of grid potential. Enclosed within the dotted outline 410 are two compounding circuits each like that shown in Figure 5. Within the dotted line enclosure 411 are the two direct current opposing circuits operated from the output potential through the transformer 412, each similar to the corresponding control circuit of Figure 4. The two main control direct current circuits, each similar to that shown in Figure 4, are within the dotted line enclosure 413, and the two alternating current out of phase grid component circuits, each also similar to the corresponding circuit of Figure 4 are within the dotted outline 414. One circuit from each of these pairs is associated with each tube, the four pairs being connected in series. The main control is accomplished through the control of the potentiometer 415 which controls the alternating current input to the transformer rectifier unit within the enclosure 413 thereby controlling both of these insulated direct current control units alike.

*Three-phase input three-phase output*

Figure 9:
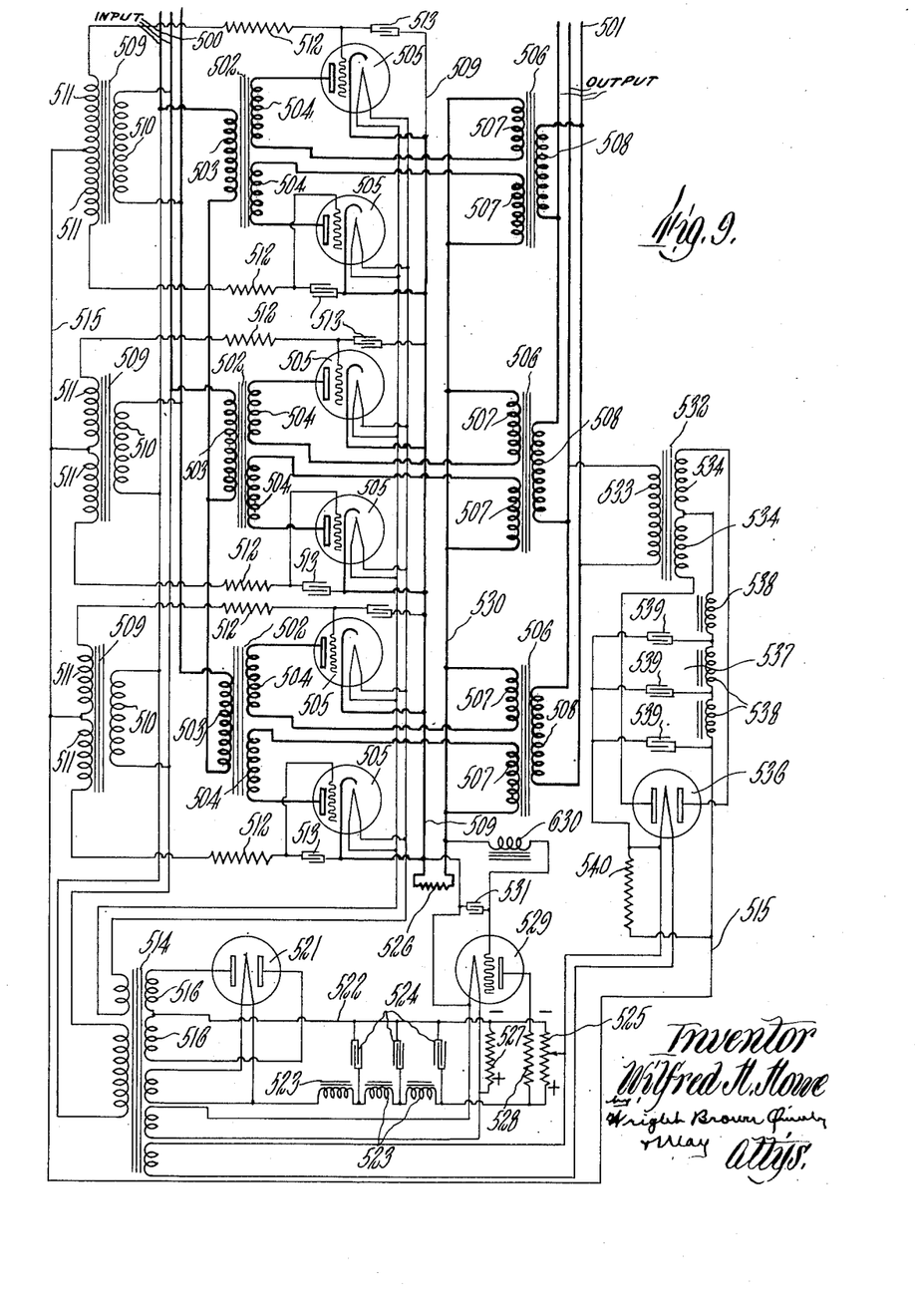
Figure 9 is a diagram showing the invention applied to three phase input-three phase output circuits.

This is illustrated in Figure 9. The three input lines are indicated at 500 and the three output lines at 501. The three phase power is fed to the main input transformers 502. Each of these transformers has a single primary 503 connected in Y across the input and it has two secondaries 504. One end of each secondary connects to the plate of the rectifier tube 505, there being six of these rectifiers, two for each phase. The other end of each secondary 504 connects to one side of the primary 507 of one of the output transformers 506. The cathodes of the rectifier tubes 505 connect to a common lead 509 and from this lead through a fixed compounding resistor 526 to a common lead 530 to the opposite end of the primaries 507 of the output transformers. These output transformers have single secondaries 508. One end of each primary winding connects to the corresponding point of the secondary 504 of an input transformer 502 while the other end of the primary connects through the lead 530 through the resistor 526 to the cathodes of the rectifier tubes 505. The secondaries 508 of the output transformers 506 are connected to each other in delta and thus to the output line 501. Each single input transformer, the pair of rectifiers associated therewith and the corresponding output transformer operate as a single phase full wave control. The three units are connected together by common cathode and transformer return leads. This provides for three phase full wave operation, frequently designated as six phase. The alternating current component of grid potential for the tubes 505 is supplied by the three transformers 509 with the primaries 510 connected in delta across the input 500. The secondaries 511 are double on each transformer 509 and are connected in Y with one side of each winding connected to a common lead 515, the other end of each winding connected through a grid resistor 512 to the grid of a rectifier tube 505. A grid condenser 513 from the grid to the cathode limits surges in the usual manner. With the transformer connections, as shown, the phase of the alternating current potential between the grid and cathode of each rectifier 505 lags just 90° behind the phase of plate cathode potential for that tube. An auxiliary transformer 514 supplies filament potential to the rectifiers 505 and for auxiliary tubes 521, 529, and 536. It also supplies plate potential to the rectifier tube 521 from the secondary winding 516. This rectified potential is fed through a filter 522 consisting of three condensers 524 and three chokes 523 and the output from this filter is used as the controlling constant direct current potential for the operation of the control system. Across the output circuit is connected a transformer 532 with its primary 533 across one phase of the output, and its two secondaries 534 are connected to the plates of the full wave rectifier tube 536. To the common point of the secondaries 534 and to the filament of the tube 536 is connected a filter 537 likewise consisting of three chokes 538 and three condensers 539 and the output of this filter is applied to opposite ends of the fixed resistor 540. With this arrangement there is a direct current potential across the resistor 540 proportional to the alternating current potential across the output circuit. One end of the resistor 540 is connected to the common point of the alternating current grid potential transformer secondaries 511 through the lead 515 and the other end of the resistor 540 is connected to the filament circuit of the tube 536 and thence to the variable slider of the potentiometer 525. The connection is in such a way that, other things remaining constant, an increase in the potential of the output circuit resulting in an increase of potential across the resistor 540 will cause the grids of the rectifier tubes 505 to become more negative by a corresponding amount. These grids becoming more negative will cause these rectifiers to tend to open at a later point in the plate cathode potential cycle and thus remain open during a less proportion of each cycle so that the flow of current will be diminished and the potential of the output circuit will be reduced. Thus any change of potential of the output circuit automatically sets up a chain of activity tending to overcome this change of output potential. The level of the output potential is set by the slider of the potentiometer 525 connected across the source of constant direct current potential provided by the filter 522, rectifier 521 and the transformer 514. An increase of the positive potential of the slider of this potentiometer tends, other things remaining constant, to make the grids of the rectifiers 505 more positive so that they pass more current, thus increasing the output circuit potential. This increase continues until it has reached a point such that the derived direct current potential across the resistance 540 has likewise increased to a point where the difference between it and the increased potential from the potentiometer 525 results in a net direct current potential on the grids of the rectifiers 505 which produces equilibrium. Since the potentials across the potentiometer 525 and the resistor 540 are large compared with the net direct current potential of the grid cathode circuits of the rectifiers 505, the potential across the potentiometer 525 is always nearly equal to the potential across the resistor 540 which in turn is proportional to the output voltage. The output voltage is thus always nearly in proportion to the potential across the potentiometer 525. Across the source of constant direct current supplying the potentiometer 525 are connected in series two resistors 527 and 528 and the plate to filament circuit of the vacuum tube amplifier 529. The total resistance of this circuit thus consists of the sum of the two constant resistors 527 and 528, plus the variable resistance of the plate to filament circuit of the tube 529. A decrease of the resistance of this tube reduces the resistance of the circuit as a whole and since this circuit is connected across a constant potential this decrease of the resistance of the circuit will produce a corresponding increase of current flow producing an increase in voltage across the constant resistance 527. This tube resistance is controlled by the grid to filament potential and this in turn is derived from the compounding resistor 526. A choke 560 and a condenser 531 tend to eliminate the pulsations of potential across the resistor 526. Connected as shown, the current flowing from the input to output circuits flows through the resistor 526 in the form of a pulsating unidirectional current flowing from the common cathode connections of the rectifiers 505 through the lead 509 and resistor 526 to the common connection 530 to the output transformer primaries 507. Thus an increase of output circuit current will result in an increase of pulsating direct current across the resistor 526 and a corresponding nearly smooth direct current potential between the grid and filament of the amplifier tube 529. As shown this increase of potential is in such a manner as to cause the grid of the amplifier tube 529 to become more negative thus increasing the impedance of the tube. From these connections an increase of current in the output circuit results in a decrease of potential across the resistor 527 which forms the connecting link between the negative end of the potentiometer 525 and the common cathode connection 509 of the rectifier tubes 505. The direction of current flow in the resistor 527 is such that its negative end connects to the potentiometer 525 while its positive end connects to the common cathode connection of the rectifier tubes 505. Thus a decrease of the potential across the resistor 527 tends to make the cathodes of the rectifier tubes 505 less positive with respect to the potentiometer 525 and hence to the grids of the rectifier tubes 505 so that the grids become more positive with respect to the cathodes. This causes an increase of current in the output circuit and so increases the output potential. This effect can be adjusted by the selection of proper values for the resistors 527 and 528 to a point such that this exactly overcomes the decrease of output potential with load which would otherwise occur. Variations of the adjustment make possible various relations between the variations of output voltage and the variations of output current. Since this compounding is controlled entirely from the output current variation and is independent of output voltage, it operates equally well at all values of output voltage especially since the decrease of output voltage on load which would occur with this compounding circuit is almost entirely a current variation effect and independent of voltage.

This circuit assumes a balanced three phase load on the output circuit. If the load is unbalanced and it is desired to maintain equal voltages in spite of this unbalance this may be accomplished by the use of three separate single phase controls or by the use of a three phase circuit similar to that shown in Figure 9 except provided with separate main controls for each phase and possibly also separate compounding controls.

In all the foregoing description it has been assumed that smooth voltage control through the entire control range is desired and for this reason an alternating component of the main rectifier controlling grid potential lagging the input alternating current by substantially 90° has been specified since this particular phase relation makes possible such smooth full range control. In any case where other than smooth full range control is desired the type of control may be determined by choice of different phase relations, the effects and peculiarities of which are set forth in some detail in my application for Letters Patent Serial No. 682,120 filed July 25, 1933, for Method of controlling rectifiers and circuits therefor, this per se not being a part of the present invention. Since the regulation is entirely electrical and on the supply to a load, it can be applied to parallel operation of loads, such as a plurality of motors or motors in parallel with other loads, or any other loads arranged in parallel.

From the foregoing description of certain embodiments of this invention, it will be understood by those skilled in the art, that various modifications and changes might be made without departing from the spirit or scope of this invention as defined by the appended claims.

I claim:

1. In combination, a cyclic input circuit, an output circuit, means including a grid controlled ionic valve through which energy passes directly to said output circuit, and grid control means including an alternating current component responsive directly to output circuit potential and two direct current potentials one of which is independently variable and serves as the main operating control.

2. In combination, a cyclic input circuit, an output circuit, means including a grid controlled ionic valve through which energy passes directly to said output circuit, a motor in said output circuit suitable for operation on cyclic power without separate field current supply, and grid control means for control of the ignition time of the ionic valve in each cycle comprising potentials derived from the cyclic potentials across the field and armature of said motor, a controlling direct current potential independent of said motor, together with means for combining these potentials and applying them to the grid of the ionic rectifier to produce a desired controllable load speed characteristic for said motor for any particular value of controlling direct current potential.

3. In combination, a cyclic input circuit, an output circuit, means including a grid-controlled ionic valve for controlling the passage of energy between said circuits, and grid controlling means including two direct current components one of which is derived from and is proportional to the output circuit potential, and the other of which is a variable controlling direct current potential, and both of which together are applied to control said valve to maintain output voltage at a substantially constant value for any one value of the variable controlling direct current potential.

4. In combination, a cyclic input circuit, an output circuit, means including a grid controlled ionic valve for controlling the passage of energy between said circuits, and grid controlling means including two direct current components one of which is derived from and is proportional to the output circuit potential, and the other of which is a variable controlling direct current potential, said two direct current potential components being connected in series-opposing, the difference being applied to the grid circuit of said valve in such manner that a relative constant potential shall be maintained in said output circuit for any one value of said variable controlling direct current component.

5. In combination, a cyclic input circuit, an output circuit, means including a grid controlled ionic valve for controlling the passage of energy between said circuits, and grid control means including a plurality of direct current components derived from output circuit potential and load conditions and acting to control the potential on said output circuit in accordance with load thereon.

6. In combination, a cyclic input circuit, an output circuit, means including a grid controlled ionic valve for controlling the passage of energy between said circuits, and grid control means including a plurality of direct current components derived from output circuit potential and load conditions and acting to control the potential on said output circuit in accordance with load thereon, said grid-controlling means also having a main variable direct current component effective to vary the potential on said output circuit independent of said load.

7. In combination, an alternating current input circuit, an alternating current output circuit, means including a grid controlled rectifier between said circuits and through which such energy passes for controlling the passage of energy from said input circuit to said output circuit, and means for controlling said rectifier during each cycle including a rectifier circuit responsive in its direct current voltage to the voltage of said output circuit, said direct current voltage forming a component of the grid voltage applied to said grid controlled rectifier.

8. In combination, an alternating current input circuit, a direct current output circuit, means including a grid controlled arc rectifier for controlling the passage of energy from said input to said output circuits, a resistance and a reactance in series across said output circuit, and a source of grid controlling potential having a component derived from across said resistance.

9. In combination, an alternating current input circuit, a direct current output circuit, means including a grid controlled arc rectifier for controlling the passage of energy from said input to said output circuits, a low pass filter across said output circuit, and a source of grid-controlling potential having a direct current component derived from said filter.

10. In combination, a cyclic current input circuit, an output circuit, and rectifying and power controlling means including means deriving entire control directly from the voltage and current flow through said rectifying means to said output circuit.

11. In combination, an alternating current input circuit, an output circuit, a grid controlled rectifier interposed between said circuits for controlling the passage of energy therebetween, and grid voltage control mechanism including (a) means responsive to output circuit voltage, (b) a resistance in series with said output circuit, and (c) means responsive to variations in voltage drop across said resistance.

12. In combination, a three phase alternating current input circuit, a direct current output circuit, a grid controlled rectifier in each phase of said input circuit delivering to said output circuit, and a grid controlling circuit including a transformer for each phase, the primaries of said transformers being connected in delta to said input and the secondaries being Y connected to sad grids, and a source of direct current connected to said grid circuits.

13. In combination, a three phase alternating current input circuit, a direct current output circuit, three gas filled rectifiers for rectifying and controlling the energy supply from said input to said output circuits, and means continuously responsive directly to electrical conditions of said output circuit for controlling said rectifiers.

14. In combination, a three phase alternating current input circuit, a direct current output circuit, a motor armature in said output circuit, a grid controlled rectifier for each phase for rectifying and controlling the supply of energy to said armature, a direct current supply for the field of said motor, means deriving a voltage electrically from the voltage across said armature, and means for impressing on the grids of said rectifiers a main adjustable direct current voltage, an alternating current voltage of the same frequency but in different phase from the input to each rectifier, and voltages from said deriving means and the current flow through said armature.

15. In combination, a cyclic input circuit having an input transformer system provided with two opposed secondaries for each phase of said input circuit, a cyclic output circuit having an output transformer system having two opposed primaries for each phase of said output circuit, one end of each input secondary being connected to one end of one of said output primaries, a pair of grid-controlled ionic valves for each phase, connections including the cathode and anode of one of said ionic valves between the other end of each input secondary and the corresponding output primary, and means for impressing a control voltage on the grid of each of said ionic valves.

16. In combination, a cyclic current input circuit, an output circuit, means including an arc rectifier through which energy passes between said circuits for controlling the output potential by controlling the energy supply from said input to said output circuit, means for adjustably determining the output potential for a given load condition, and means for controlling the ignition time of said rectifier in each cycle including means responsive to variations in load conditions in said output circuit to provide a selected response to a specific variation independent of the output potential.

17. In combination, an alternating current input circuit, an output circuit, means including an arc rectifier through which such energy passes for controlling the energy supply from said input to said output circuit, and means controlling the ignition time in each cycle of said rectifier including a direct current component responsive to load conditions in said output circuit and a second component which can be varied without directly altering the effects of said first component.

18. In combination, an alternating current input circuit, an alternating current output circuit, means including a grid controlled rectifier interposed between said circuits for controlling the passage of energy therebetween, and means including mechanism responsive to output circuit voltage and a current transformer in said output circuit for controlling the voltage impressed on said grid.

19. In combination, a cyclic input circuit, an output circuit, means including a grid controlled ionic valve through which energy is fed to said output circuit, and means controlling the ignition time of said ionic valve in each cycle including a variable direct current means and a direct current component responsive to the potential in said output circuit and independent of said variable direct current means.

20. In combination, an alternating current input circuit, an output circuit, a grid-controlled ionic valve interposed between said circuits, and grid controlling means controlling the ignition time of said valve including means deriving entire control directly from the current flow through said valve to said output circuit.

21. An electric power controlling system comprising an alternating current power source, an alternating current load circuit, and power-controlling means between said source and load circuit for controlling the passage of energy from one to the other including a hot cathode rectifier having separate control of ignition time in each cycle and interposed between and through which power passes from said source to said load circuit, and means including a current transformer and a low pass filter in said load circuit for controlling said ignition time.

22. An electric power controlling system comprising an alternating current power source, a direct current load circuit, a grid-controlled hot cathode rectifier having its time of ignition in each cycle controlled by the voltage impressed on said grid and interposed between said source and load circuit and through which the power passes from said source to said circuit, a motor in said load circuit, and means responsive directly to electrical conditions in said circuit caused by the load on said motor for controlling the grid of said rectifier to maintain a controlled relation between load and motor speed.

23. In combination, a cyclic input circuit, a direct current output circuit, at least two ionic valves for controlling the passage of electric power from said input to said output circuit, and a current transformer effected by a cyclic component of said output and a supplemental controlling direct current component for controlling said valves.

24. In combination, a cyclic input circuit, an output circuit, means including an ionic valve for controlling the passage of power from said input to said output circuits, and means for controlling said valve including a filter system for control of harmonics derived from said output circuit.

WILFRED H. HOWE.